United States Patent [19]

Watanabe

[11] 3,977,246

[45] Aug. 31, 1976

[54] MAGNETIC FLOWMETER HAVING IN PHASE NOISE COMPENSATION

[75] Inventor: Masayasu Watanabe, Yokohama, Japan

[73] Assignee: Hokushin Electric Works, Ltd., Tokyo, Japan

[22] Filed: June 17, 1975

[21] Appl. No.: 587,687

[30] Foreign Application Priority Data

June 28, 1974  Japan............................. 49-74697

[52] U.S. Cl. .......................................... 73/194 EM
[51] Int. Cl.² .......................................... G01F 1/58
[58] Field of Search ............................... 73/194 EM

[56] References Cited
UNITED STATES PATENTS

| | | |
|---|---|---|
| 3,316,762 | 5/1967 | Westersten ............... 73/194 EM |
| 3,449,951 | 6/1969 | Westersten ............... 73/194 EM |
| 3,739,640 | 6/1973 | Folts ........................ 73/194 EM |

Primary Examiner—Charles A. Ruehl

[57] ABSTRACT

An electromagnetic flowmeter in which the fluid to be metered is conducted through a flow tube in which it intercepts a magnetic field, the voltage induced in the fluid being transferred to electrodes disposed at diametrically opposed points on the tube. In phase noise arising from asymmetry in the main magnetic fluxes as well as noise resulting from leakage magnetic fluxes are both compensated for by a unitary compensation system.

6 Claims, 11 Drawing Figures

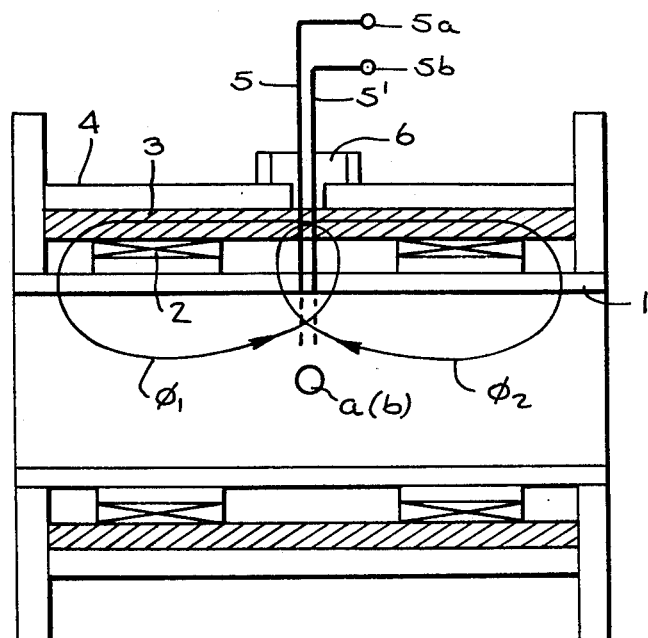
Fig. 7.
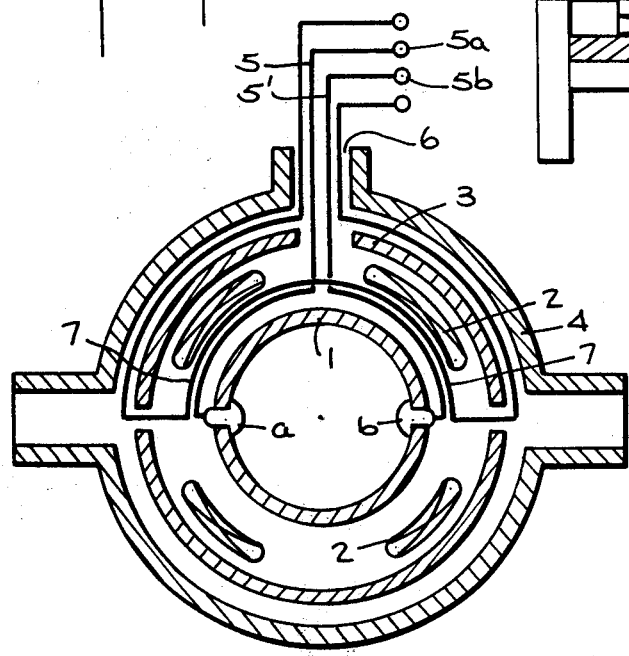
Fig. 6.
Fig. 8.
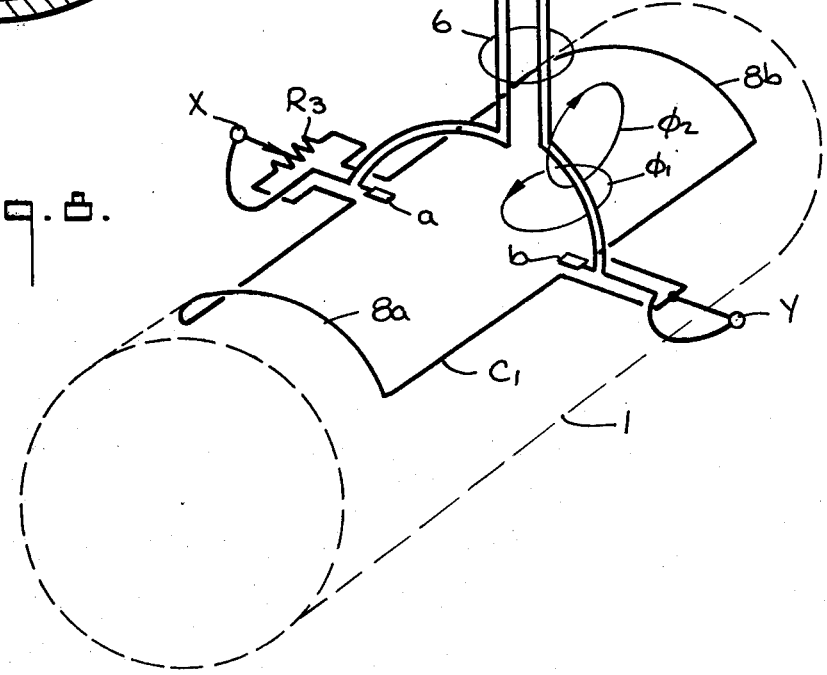

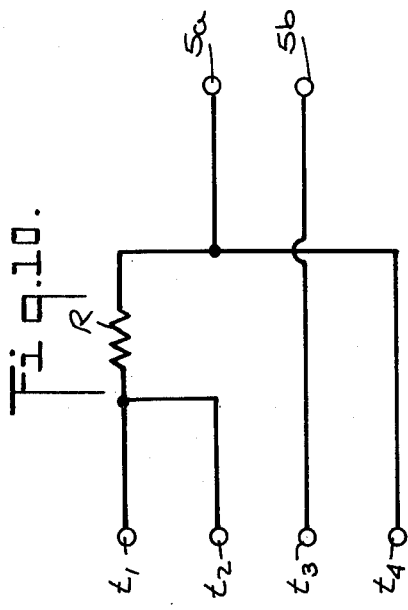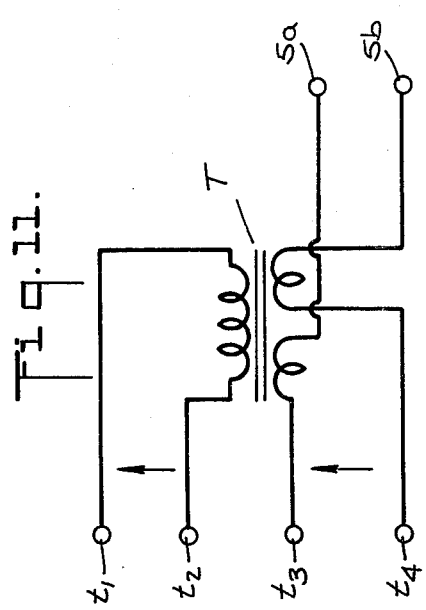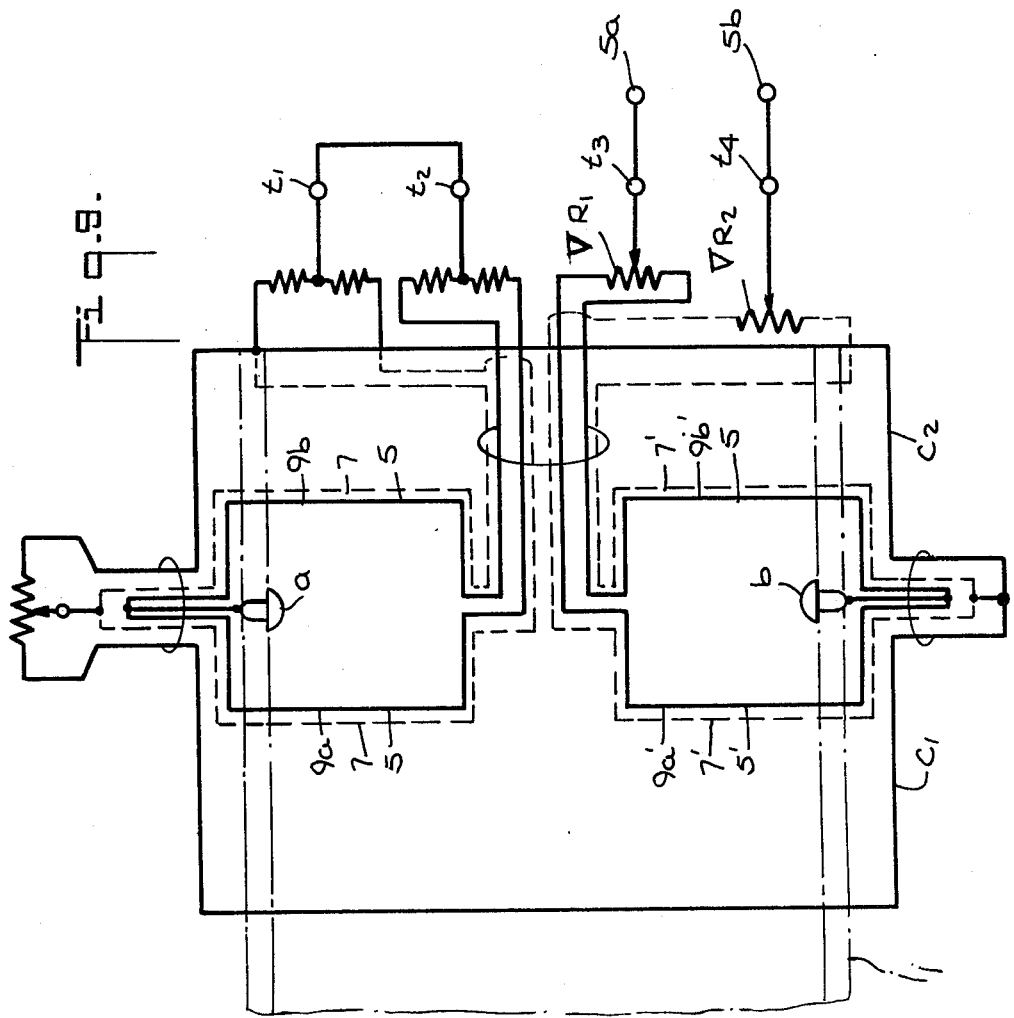

MAGNETIC FLOWMETER HAVING IN PHASE NOISE COMPENSATION

BACKGROUND OF INVENTION

This invention relates generally to electromagnetic flowmeters, and more particularly to improved means for eliminating in phase noise components from the signal generated by a flowmeter.

In an electromagnetic flowmeter, the fluid whose flow rate is to be metered is conducted through a flow tube provided with a pair of diametrically-opposed detecting electrodes, a magnetic field perpendicular to the longitudinal axis of the tube being established by an electromagnet. When the fluid passing through the tube intersects this magnetic field, a voltage is induced therein which is transferred to the electrodes. This voltage, which is proportional to the average velocity of the fluid and hence to its average volumetric rate, is then amplified and processed to actuate a recorder or indicator.

In a conventional electromagnetic flowmeter, even when the fluid to be measured is not flowing through the tube, in phase noise is developed across the detecting electrodes. This in phase noise varies with time, thereby producing a changing zero drift. Thus while the conventional flowmeter has good linearity characteristics in flow measurement, it suffers from the drawback that flowing liquids of low velocity cannot be precisely measured.

There are two main sources for in phase noise. First is in phase noise arising from the surface condition of the electrodes, and second is noise due to the condition of the magnetic field. Inasmuch as in phase noise resulting from the surface condition of the electrodes can be obviated by expedients disclosed in our Japanese Utility Model 917,091, the present invention is concerned solely with in phase noise resulting from the second source, namely the condition of the magnetic field.

The causes of in phase noise arising from the condition of the magnetic field fall into two distinct classes. The first class covers in phase noise resulting from an asymmetry in the main magnetic fluxes passing through respective regions separated by a plane that is parallel to the lines of flux and including the electrodes. The second class covers in phase noise induced in a loop constituted by the lead wires to the electrodes in combination with the liquid bridging the electrodes, by reason of the asymmetry of leakage magnetic fluxes arising from the asymmetry of the main magnetic fluxes.

Means have heretofore been proposed by us to eliminate in phase noises whose causes fall into the above-described classes. Thus our Japanese Pat. No. 616,372 discloses means to overcome in phase noises whose cause lies in the first class, while Japanese patent application Ser. No. 60,375/1974 covers means applicable to in phase noise whose cause lies in the second class.

The disadvantages of the arrangements disclosed in our prior Japanese patent and patent application, identified above, is that the respective compensating means must be independent of each other and disposed in the narrow space between the magnetic core surrounding the excitation coil of the flowmeter and the flow tube.

SUMMARY OF INVENTION

In view of the foregoing, it is the main object of this invention to provide simple and highly effective means to compensate for in phase noise in an electromagnetic flowmeter.

More particularly, it is an object of this invention to provide in a flowmeter, a unitary compensating system acting to compensate both for noise arising from an asymmetry in the main magnetic fluxes and for noise resulting from an asymmetry of the leakage magnetic fluxes.

Briefly stated, these objects are attained in a unitary compensation system for a magnetic flowmeter, which system includes á first compensating coil for first-class in phase noise arising from asymmetry of the main magnetic fluxes in respective regions within the flow tube separated by a plane parallel to these lines of flux and including the detecting electrodes, and a second compensating coil for second-class in phase noise induced in a loop constituted by the lead wires connected to the electrodes in combination with the liquid bridging the electrodes by reason of an asymmetry in the leakage magnetic fluxes resulting from the asymmetry of the main fluxes.

The two coils are included in a circuit arrangement having common output terminals at which an error voltage proportional to both the first and second class noises is established, which error voltage is applied in opposition to the output signal from the electrodes to eliminate the noise components therefrom.

OUTLINE OF THE DRAWINGS

For a better understanding of the invention as well as other objects and further features thereof, reference is made to the following detailed description to be read in conjunction with the accompanying drawings, wherein:

FIGS. 6 and 7 are a cross-section and longitudinal section respectively of the magnetic flowmeter, showing how the second class of in phase noise is generated and how compensation therefor is effected;

FIG. 8 is a perspective view of a first preferred embodiment of a unitary compensation system in accordance with this invention;

FIG. 9 is a circuit diagram of a second preferred embodiment of a unitary system in accordance with this invention, wherein a compensating coil for 90 degree noise is combined with the in phase noise compensating means; and FIGS. 10 and 11 show alternative arrangements for signal lead out means.

DESCRIPTION OF INVENTION

Cause and Elimination of In Phase Noise (First Class)

Figure 1:
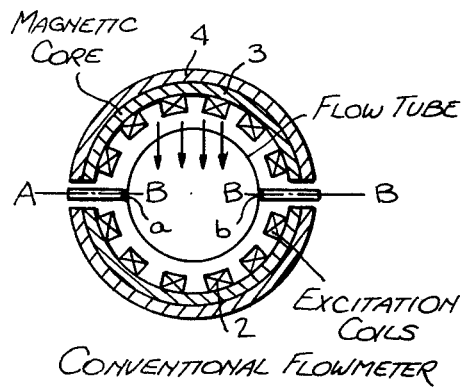
FIG. 1 is a cross-sectional view of the basic structure of a conventional magnetic flowmeter.

Referring now to FIG. 1, which is a cross-sectional view of a conventional magnetic flowmeter including a flow tube 1 through which is conducted the fluid to be metered, it will be seen that tube 1 is surrounded by excitation coils 2. These coils serve to establish a magnetic field which is intersected by the fluid to induce a signal that is transferred to the detecting electrodes a and b disposed at diametrically-opposed points on the tube.

Figure 2:
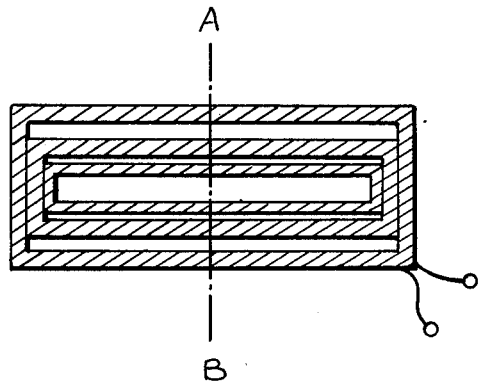
FIG. 2 is a plan view of a saddle-shaped excitation coil included in the magnetic flowmeter shown in FIG. 1.

Coils 2 have upper and lower sections which are symmetrically arranged with respect to a transverse axis A-B extending through electrodes a and b, the coils being surrounded by a cylindrical magnetic core 3 contained within the cylindrical case 4 of the flowmeter. As shown in FIG. 2, the saddle-shaped excitation coils 2 are of the so-called cosine type typically used in a conventional flowmeter to produce a homogeneous magnetic field.

Figure 3:
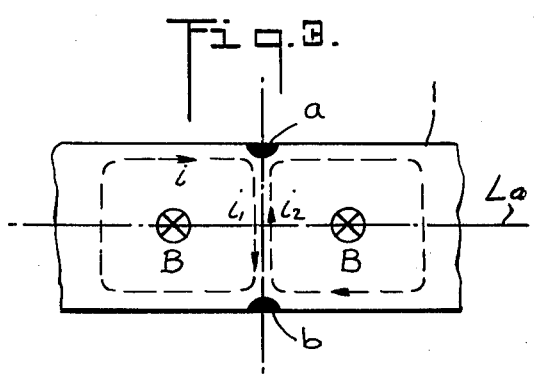
FIG. 3 is a longitudinal section taken through line A—B in FIG. 1.

Reference is now made to FIG. 3 which is a longitudinal section taken parallel to the axis of flow tube 1 and passing through detecting electrodes a and b. Magnetic core 3 and case 4 are omitted in this figure. It will be seen in FIG. 3 that the lines of magnetic flux B are perpendicular to the longitudinal axis $La$ of flow tube 1, thereby inducing an electrical current within the tube. This current is constituted by a current component $i_1$ flowing on one side of transverse axis A-B extending between the electrodes a and b, and a separate current component $i_2$ flowing on the other side of this transverse axis.

When the magnetic fields in the respective regions which are separated by a plane parallel to the magnetic lines of flux B and including electrodes a and b are perfectly symmetrical, equal currents of opposite polarity $i_1$ and $i_2$ will flow and no error signal voltage will appear across the electrodes. But when these magnetic fields are not symmetrical, an error signal will be developed, this error signal representing the in phase noise component in the output signal of the flowmeter.

The reason why asymmetrical magnetic fields exist in a magnetic flowmeter will now be explained. As is known, there exists between the current I flowing in excitation coils 2 and the magnetic flux density B, a phase lag to a degree that depends on hysteresis or the iron loss of the magnetic core.

It is to be noted, incidentally, that even though local zones within the magnetic core exhibit different iron losses, symmetrical magnetic fields would nevertheless be produced should these zones be symmetrically arranged with respect to transverse axis A-B and each iron loss in these local zones varies at the same rate. In that event, equal currents of opposite polarity would flow in tube 1 and in phase noise would not then be developed across electrodes a and b.

But when these local iron loss zones are not symmetrically disposed with respect to transverse axis A-B and when each iron loss does not vary at the same rate, flux density phase lag is experienced and the magnetic fields in the respective regions on either side of the plane parallel to the magnetic lines of flux are asymmetrical, causing the generation of in phase noise.

To summarize, the phase of current components $i_1$ and $i_2$ in FIG. 3 is influenced by the phase of the flux density B in the respective regions on either side of the plane that includes electrodes a and b, which flux density is subject to variations determined by the iron loss.

Figure 4:
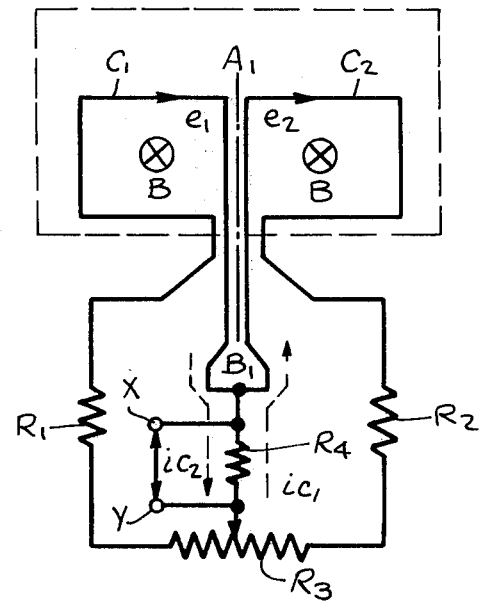
FIG. 4 is a circuit diagram of the first compensating coil arrangement to compensate for the first class of in phase noise.

FIG. 4 shows the basic circuit to compensate for the first class in phase noise resulting from asymmetry of the main magnetic fields in the respective regions. It will be seen that compensating coils $C_1$ and $C_2$ are symmetrically arranged with respect to a transverse axis A' - B'. These coils are connected to each other through a resistor $R_4$ in a manner whereby the voltages $e_1$ and $e_2$ respectively induced in coils $C_1$ and $C_2$ are applied to resistor $R_4$ in reverse polarity.

A resistor $R_1$ is connected in series with coil $C_1$ and a resistor $R_2$ is connected in series with coil $C_2$, these resistors being connected to opposite ends of a potentiometer $R_3$ whose adjustable tap is connected to resistor $R_4$ to establish a balance between the network including coil $C_1$ and the network including coil $C_2$. Coils $C_1$ and $C_2$ are disposed over excitation coil 2 so that the axis A'-B' conforms to axis A-B shown in FIG. 2.

Voltages $e_1$ and $e_2$ induced in compensating coils $C_1$ and $C_2$ are proportional to the flux density B of the magnetic fields which intercept the coils. These magnetic fields also induce current components $i_1$ and $i_2$, these current components as well as voltages $e_1$ and $e_2$ being influenced by the phase of flux density B, which is subject to variations determined by the iron loss.

It is noted incidentally that in the induced voltages $e_1$ or $e_2$, the greater part is the J phase component (90° out of phase component), even though its rate varies with the phase condition of flux density B. Therefore, compensation for in phase noise is carried out by utilizing the remaining in phase noise component in the induced voltages.

Flowing in opposite directions in resistor $R_4$ are a current $ic$ that depends on the induced voltage $e_1$ and a current $ic_2$ that depends on induced voltage $e_2$. As a consequence, a positive or negative error signal voltage $e_c$ is developed across resistor $R_4$ and presented at terminals X and Y connected to the ends of this resistor. The magnitude and polarity of this error signal voltage is determined by the nature of the asymmetry in the main magnetic fields.

Figure 5:
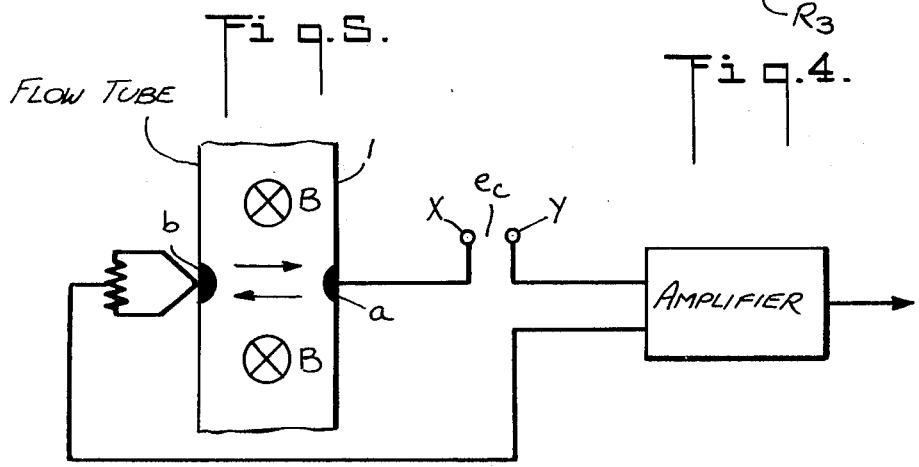
FIG. 5 is a circuit diagram showing how the noise component signal detected by the first compensating coil is applied to the output of the flowmeter.

As shown in FIG. 5, error signal voltage $e_c$ developed at terminals X and Y is applied in series opposition with the output signal developed at electrodes a and b to the amplifier of the flowmeter. The applied error signal voltage therefore acts to cancel out the in phase noise component in the signal and in this way to eliminate the zero drift effect arising from asymmetry of the main magnetic fluxes.

With regard to the J phase or quadrature voltage component in voltage $e_c$, this noise component can be eliminated by well-known means for this purpose, hence no consideration has been given to this component.

Cause and Elimination of In Phase Noise (Second Class)

We shall now explain how in phase noise of the second class is induced in a loop constituted by the signal lead wires for electrodes a and b in combination with the liquid in the flow tube bridging these electrodes by reason of asymmetry in leakage magnetic fluxes arising from an asymmetry of the main fluxes.

As shown in FIG. 6, the lead wires 5 and 5' are connected to electrodes a and b to obtain a flowmeter output signal, these wires extending along the circumference of flow tube 1. The lead wires merge to form a bundle at a point equidistant from electrodes a and b, and the bundled wires are led out by way of a passage 6 going through core 3 and case 4. Alternatively, the wire 5 and 5' could be arranged to pass over the outer surface of excitation coil 2.

When tube 1 is filled with liquid and electrodes a and b are conductively bridged by this liquid, an imaginary loop is produced constituted by signal lead wires 5 and 5' and electrodes a and b in combination with the conductive liquid path extending therebetween.

As best seen in FIG. 7, when leakage magnetic flux $\phi_1$ and leakage magnetic flux $\phi_2$ generated by the upper section of excitation coils 2 intersect the loop, an electrical current is induced therein. If the leakage magnetic fluxes $\phi_1$ and $\phi_2$ are symmetrical, a noise component is not developed in the loop. But since different iron loss local zones exist in magnetic core 3, as previously explained, phase differences inevitably appear between the magnetic fluxes. As a consequence, the second-class of in phase noise is induced in the loop.

To compensate for second-class in phase noise, a compensating coil having sections 7 and 7' is provided as shown in FIG. 6, these sections being in close proximity to lead wires 5 and 5', preferably being bundled therewith. The ends of coil sections 7 and 7' are adjacent to electrodes a and b and leads therefrom pass through openings in core 3, these leads then extending along the outer surfaces of core 3 and being led out through passage 6.

Since compensating coil sections 7 and 7' conform to the imaginary loop defined by the electrode leads 5 and 5', a voltage proportional to the in phase noise is induced in the loop. By applying this voltage in opposition to the signal appearing at output terminals 5a and 5b connected to the electrodes, in phase noise arising from asymmetry of leakage magnetic fluxes can be eliminated.

First Embodiment

In the present invention, compensating coils $C_1$ and $C_2$ for the first class of in phase noise and the compensating coil sections 7 and 7' for the second class of in phase noise are combined in a unitary system so that noise signals for both noises may be derived from common output terminals.

Referring now to FIG. 8, there is shown a first preferred embodiment of the invention. In this figure, components which correspond to those shown in FIGS. 1 to 7 are identified by like reference numerals (magnetic core 3 and case 4 are omitted).

Compensating coils $C_1$ and $C_2$ are arranged to overlie the surface of cylindrical flow tube 1. Between output terminals X and Y, there are provided at electrically neutral points, voltages induced in coils $C_1$ and $C_2$ are fed in reverse polarity so as to obtain error voltages resulting from the first class of in phase noise.

Lead wires 7 and 7', which constitute sections of the compensating coil for the second class of in phase noises, are arranged to run adjacent to the signal lead wires 5 and 5' connected to electrodes a and b. Lead wires 7 and 7' are connected respectively between output terminals X and Y and common output terminals X' and Y'. Thus lead wires 7 and 7' not only act as lead wires for compensating coils $C_1$ and $C_2$ for the first-class in phase noises but also function as sections of the compensating coil for the second class of in phase noises. In other words, the compensating coil for the second class of noises is composed of lead wires 7 and 7' and compensating coils $C_1$ and $C_2$.

Consequently, across common output terminals X' and Y', there appears the noise signal component arising from asymmetry of the main magnetic fluxes (first class) as well as the noise signal component arising from asymmetry of the leakage magnetic fluxes $\phi_1$ and $\phi_2$ (second class), which components appear simultaneously in the form of a composite signal.

These noise components can be removed from the output signal of the flowmeter by applying the voltage generated across the common output terminals X' and Y' in opposition to the output signal appearing at terminals 5a and 5b. In this embodiment, output terminal 5b and terminal Y' of the compensatinng system are connected together, whereby the noise compensated signal may be derived from between output terminal 5a and terminal X'.

With regard to the configuration of the compensating coil, it is preferable that the bridge portions 8a and 8b of the respective coils $C_1$ and $C_2$ be arranged as far apart as possible so as to detect the leakage magnetic fluxes $\phi_1$, $\phi_2$ effectively. Further, the size of coils $C_1$ and $C_2$ is made to generally conform to the size of excitation coil 2.

Second Embodiment

Referring now to FIG. 9, there is shown a second preferred embodiment of a compensation system according to the invention. In this embodiment, compensating coils for 90 degree or quadrature noise are coordinated with the in phase noise compensating system. Since compensating means for 90° noise is fully disclosed in our Japanese Pat. No. 318,381, we shall now merely briefly outline these means.

Generally, when signal lead wires 5a, 5b are arranged precisely in the longitudinal plane perpendicular to excitation coils 2, magnetic coupling does not occur between the imaginary loop and excitation coils 2. However, in actual practice, this precise arrangement, which is critical, is difficult to attain and some magnetic coupling exists, thereby generating noise which is 90° out of phase with the flow signal.

To eliminate such quadrature noise, a compensating coil constituted by sections 9a and 9b formed by utilizing signal lead wire 5 and the lead wire 7 of the compensating coil, and a compensating coil constituted by sections 9a' and 9b' formed by utilizing signal lead wire 5' and lead wire 7' of the compensating coil are provided. In this arrangement, 90° noise can be compensated for by adjusting potentiometers $VR_1$ and $VR_2$.

In this unitary arrangement, compensation for the in phase noise induced by asymmetry of the main magnetic fluxes, compensation for the in phase noise induced by asymmetry of leakage magnetic fluxes as well as compensation for the 90° noise can be effectively accomplished simultaneously.

Signal Lead-Out Arrangements

Referring now to FIGS. 10 and 11, there are shown other examples of signal lead-out arrangements. In these figures, terminals $t_1$, $t_2$, $t_3$ and $t_4$ are connected to corresponding terminals $t_1 - t_4$ in FIG. 9. Terminals 5a and 5b are flow signal terminals connected to electrodes a and b. The transformer T shown in FIG. 11 serves to balance electrostatic capacitance between output terminal 5a and ground, as well as electrostatic capacitance between output terminal 5b and ground.

Accordingly, when transformer T is used in the measurement of low conductivity flow, precise measurements can be attained. Moreover, in this case, it is desirable that the turn ratio of the transformer coils be 1 to 1.

It is apparent from the foregoing that a magnetic flowmeter in accordance with this invention has the following significant features:

A. The compensating coil arrangement is simple and easily constructed.

B. In phase noise induced by asymmetry of main magnetic fluxes and in phase noise induced by asymmetry of leakage magnetic fluxes are compensated simultaneously.

C. Zero error due to such external variations as voltage variations, frequency variations, temperature variations, and so on can be eliminated simultaneously.

D. For low velocity flows, one can attain precise measurement.

E. Because in phase noises are completely eliminated, zero drift effect does not arise even when the flowing direction changes from time to time.

F. Since harmonic noise which generally appears in the conventional detection circuit due to the influence of the magnetic core 3 can be compensated simultaneously, an output having an excellent signal-to-noise ratio can be obtained.

Although in the embodiment shown in FIG. 8 the saddle-shaped compensating coils $C_1$, $C_2$ are arranged to conform with the saddle-shaped excitation coils 2, the configuration of the compensating coil may be modified to conform to the other excitation coil shapes. For instance, when a diamond-shaped coil is employed as an excitation coil, then the compensating coil should be arranged to have a like configuration to carry out effective compensation.

While there have been shown and described preferred embodiments of a magnetic flowmeter having in phase noise compensation in accordance with the invention, it will be appreciated that many changes and modifications may be made therein without, however, departing from the essential spirit thereof.

I claim:

1. In an electromagnetic flowmeter provided with a flow tube through which is conducted the liquid to be metered, excitation coils to establish a magnetic field in the tube transverse to the direction of flow and a pair of electrodes disposed at diametrically opposed positions, whereby flowing liquid intersecting said field induces a signal in said liquid which is transferred to said electrodes and conducted by signal leads to a signal output; a unitary compensating system for eliminating in phase noise components from the signal, said system comprising:

A. a circuit including a pair of first compensating coils for sensing a first class of in-phase noise arising from asymmetry of the main magnetic fluxes produced by said excitation coils in respective regions of the tube separated by a plane parallel to the lines of flux and including said electrodes, each of the first coils being disposed in one of these regions, and means connecting said first coils to first class output terminals to cause the voltage induced in one coil to oppose that of the other to produce an error voltage at said first class output terminals reflecting said asymmetry;

B. a second compensating coil for sensing a second class of in-phase noise induced in a loop constituted by said signal leads in combination with the liquid in said tube bridging said electrodes, said noise being induced in said loop by reason of asymmetrical leakage magnetic fluxes arising from said asymmetrical main fluxes, said second coil being defined by said first compensating coils and a pair of lead wires;

C. common output terminals connected through said pair of lead wires of the second coil to said first class output terminals whereby yielded at said common output terminals is a combined error voltage reflecting both the first class noise resulting from asymmetry of the main magnetic fluxes and second class noise resulting from the leakage magnetic fluxes; and D. means to apply said combined error voltage developed at said common output terminals in opposition to the induced signal appearing at said signal output to provide a noise-compensating output which is corrected for said first and second class in-phase noises.

2. A system as set forth in claim 1, wherein said flow tube has a circular cross-section and said excitation coils have a saddle shape conforming to the circumference of said circular flow tube.

3. A system as set forth in claim 2, wherein the shape of said first compensation coils conforms to that of the excitation coils.

4. A system as set forth in claim 3, wherein said excitation coils are surrounded by a cylindrical magnetic core.

5. A system as set forth in claim 4, wherein said core is surrounded by a cylindrical case.

6. A system as set forth in claim 1, further including means to compensate said system for quadrature voltage effects.

* * * * *

UNITED STATES PATENT OFFICE
CERTIFICATE OF CORRECTION

PATENT NO. : 3,977,246
DATED : August 31, 1976
INVENTOR(S) : Masayasu Watanabe

It is certified that error appears in the above-identified patent and that said Letters Patent are hereby corrected as shown below:

Column 4, line 27 "icthat" should have read -- $ic_1$ that --

Column 5, line 45 "there" should have read -- which --

Column 8, line 31 "compensating" should have read -- compensated --

Signed and Sealed this

Ninth Day of November 1976

[SEAL]

Attest:

RUTH C. MASON
*Attesting Officer*

C. MARSHALL DANN
*Commissioner of Patents and Trademarks*